(12) United States Patent
Tullis et al.

(10) Patent No.: US 6,222,174 B1
(45) Date of Patent: Apr. 24, 2001

(54) METHOD OF CORRELATING IMMEDIATELY ACQUIRED AND PREVIOUSLY STORED FEATURE INFORMATION FOR MOTION SENSING

(75) Inventors: Barclay J. Tullis, Palo Alto; Larry McColloch, Santa Clara, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/263,747

(22) Filed: Mar. 5, 1999

(51) Int. Cl.[7] .............................. H01L 27/00; G06M 7/00; H01J 3/14
(52) U.S. Cl. .................. 250/208.1; 250/221; 250/221.1; 250/234; 250/235
(58) Field of Search ................................. 250/208.1, 221, 250/221.1, 234, 235

(56) References Cited

U.S. PATENT DOCUMENTS

| | | | |
|---|---|---|---|
| 5,149,980 | 9/1992 | Ertel et al. ............................ | 250/561 |
| 5,578,813 | 11/1996 | Allen et al. ......................... | 250/208.1 |
| 5,578,817 | 11/1996 | Bidiville et al. ..................... | 250/221 |
| 5,644,139 | 7/1997 | Allen et al. ........................... | 250/557 |
| 5,686,720 | 11/1997 | Tullis .................................. | 250/208.1 |
| 5,729,008 | 3/1998 | Blalock et al. ..................... | 250/208.1 |

*Primary Examiner*—Georgia Epps
*Assistant Examiner*—Michael A. Lucas (57) ABSTRACT

Determinations of velocity and navigation of an imaging device relative to a region of interest are based on double correlation processing. A time series of images of detectable features within the region of interest is acquired and correlated with previously stored location information for uniquely distinguishing locations within the region of interest. Thus, one correlation step is to compare the positions of features within the time series with the previously stored location information. The other correlation step is to track the variations in positions of the features within the time series. Preferably, the imaged features that are used for correlation are randomly distributed. However, in some applications, a known systematic distribution of features may be used. The processing is applicable to hand scanning, robotic control, and similar operations.

22 Claims, 7 Drawing Sheets

METHOD OF CORRELATING IMMEDIATELY ACQUIRED AND PREVIOUSLY STORED FEATURE INFORMATION FOR MOTION SENSING

TECHNICAL FIELD

The invention relates generally to methods of identifying either or both of velocity and navigation of an imaging device relative to a region of interest, and relates more particularly to detecting velocity or navigation using a photosensor array.

BACKGROUND ART

There are a variety of applications which require measurements of motion of a device relative to a region of interest, such as a surface of a document or a surface region within a robotically controlled system. Imaging techniques are known for measuring the relative velocity and determining the relative positions of an imaging device and a region of interest. In one such technique, a human operator views structural features, as imaged by a photosensor array, and judges position and motion based upon movement of the structural features within the field of view of the photosensor array. If the arrangement of the imaging system and the viewed region is controlled, it is possible for the measurements of position and/or velocity to be automatically interpreted from the relationship of the individual signals provided by the elements of the photosensor array. This technique may be used to monitor movement of an optical mouse relative to a rectangular grid by sensing and counting grid lines passing through a field-of-view of an imaging arrangement fixed to the mouse. The technique may also be used for monitoring rotation of a shaft having image-detectable encoding, or may be used to control operation of a robotic device.

A related operation is described in U.S. Pat. No. 5,578,817 to Bidiville et al., which discloses a device for use with a computer mouse or trackball. A pattern of spots is formed on a ball and is illuminated with one or more light sources. An optical element, such as a lens or diffractive element, may be used to focus an image of the ball on a sensor array. The signals generated by the array are then acted upon by logic circuits to convert the movement of the ball to X and Y components for determining corresponding movement of a cursor on a video display. Motion detection is based on tracking the differences in spatial intensity of the spots. The patent describes an "edge" as a difference of intensity between two adjacent black and white pixels at the sensor array. The basic operation of the sensor array is to recognize the edges and track changes over time. The cursor of the video display is manipulated in response to changes in the positions of the edges. The process is not limited to use with spherical objects, since it can be applied to tracking movement along a planar surface having a pattern of spots.

A method of determining the distance that is traveled by a sheet of paper within a printer or document scanner is described in U.S. Pat. No. 5,149,980 to Ertel et al., which is assigned to the assignee of the present invention. A linear array of light sensors is directed at the paper to sense light issuing from the paper. This produces a reference array of light signal strengths. After the paper is moved in a given direction, a second sampling of light signal strengths is generated from the light sensors. A cross-correlation function compares the second sampling to the reference array of signal strengths so as to determine the distance that the paper has moved in the given direction during the time period between acquiring the reference array and the second sampling. The cross-correlation function can be repeatedly applied as subsequent samplings of light signal strengths are generated using the linear array of light sensors. The one-dimensional approach may be extended to determine the vector of two-dimensional movement by substituting a two-dimensional array of sensor elements for the linear array.

Employing correlations among samplings from a photosensor array for the purpose of measuring motion is also described in U.S. Pat. Nos. 5,686,720 to Tullis and 5,644,139 to Allen, Tullis et al. 5,578,813 to Allen, Tullis et al., and 5,729,008 to Blalock et al., all of which are assigned to the assignee of the present invention. In a document scanning application of the inventions, navigation information is acquired simultaneously with acquiring image information of a scanned document. The navigation information may be acquired by using one or more navigation sensors that image "inherent structural features," which are defined as features of an original that are characteristic of processes for forming the original and are independent of forming image data and/or systematic registration data on the original. For example, if the original is a paper product, the inherent structural features may be paper fibers. Correlations among frames of navigation information from a navigation sensor may be used to map the image information that is acquired simultaneously with the navigation information. Since the process is able to arrange the image information based upon a detectable scan path of the image and navigation sensors, a reliable document reproduction can be achieved in applications that allow unconstrained free-hand movement of the sensors relative to the document.

While the correlation methods operate well in applications in which measurements of motion or position are based on images of features that are easily distinguishable, further improvements are desired. Even when the features that are imaged for purposes of acquiring navigation information are uniquely arranged, there is a susceptibility to inaccuracy if the imaging system or the image correlation processing is not sufficiently sophisticated to detect differences in the arrangement of the features.

What is needed is a method that enhances the sensitivity, accuracy and precision of feature differentiation, where the differentiation is used as a basis for determining either or both of velocity and navigation of an image-acquiring device relative to a region of interest.

SUMMARY OF THE INVENTION

A method of determining velocity, navigation, or both uses "double correlation processing." A time series of images of detectable features within a region of interest is acquired using an imaging device, such as a photosensor array. A correlation of positions of imaged features within first and second images of the sequence is performed in order to provide one source of velocity and/or navigation information. As a second source, one or both of the same images may be used to identify correlations with previously stored position information that is relevant to distinguishing locations within the region of interest. Thus, the accuracy and precision of motion measurements may be significantly enhanced by combining a step of cross-correlating the images within the time series (i.e., an intra-sequence correlation step) with a step of correlating the images with previously stored position information that uniquely distinguishes locations within the region of interest (i.e., an extra-sequence correlation step).

In the preferred embodiment, the detectable features are randomly distributed within the region of interest. The distribution is identified and stored prior to acquiring the time series of images. The approach to acquiring the position information that defines the distribution is not critical. One approach is to scan the region of interest with the same imaging device (e.g., photosensor array) that is subsequently used to acquire the time series of images. A significant benefit to using this approach, particularly with randomly distributed features, is that the approach is not susceptible to the effects of previous contamination or surface damage to the region of interest, since the features will still be randomly located and equally suitable to the correlation processing. However, there may be applications in which a systematic distribution of features is preferred.

The distribution of detectable features should be in a pattern that enables accurate measurements of either or both of velocity and navigation in two dimensions. Dots may be formed on a surface and may be random with respect to any or all of sizes, shapes, and locations. In an application in which the region of interest is a document that is scanned for the purpose of subsequently reproducing an image on the document, the detectable features may be inherent structural features, such as paper fibers. Paper fibers and other inherent structural features of various target surfaces can be made to reveal high contrasts when grazing illumination is used (e.g., illumination at an angle of less than 16° relative to the target surface). Other target surfaces may provide sufficient contrast when incident illumination is at a much greater angle.

As an alternative to a random distribution of features, there may be a known systematic distribution. As one example, the pattern may include a series of log cycles which can be used to accurately calculate absolute position within any cycle and the pattern may further include diverging lines that may be used to differentiate the cycles. This permits an accurate and precise absolute position measurement anywhere along the length of the target surface.

When applying the correlation methods of surface tracking using a time series of images of the region of interest having randomly distributed features, there is an opportunity to use DC-filtering and/or bandpass filtering to increase the signal-to-noise ratio of correlation values. Any influences of pixel values that do not change significantly when the relative movement between the imaging device and the region of interest occurs can be filtered prior to the correlation process. Similarly, pixel values that change by an order of magnitude less than the majority of the other pixels are likely to be noise and can be filtered to provide improved correlation performance. In instances in which very little noise is present, it is useful to apply non-linear transformations (such as logs) to non-linearly compress the range of raw pixel value data, and to take powers of spatial gradients to expand the contrast values when the majority of the spatial gradients are small.

As previously noted, one application of the method is to determine navigation information that is then used to map independently acquired image information of a scanned document. Lateral movement along the document is determined by correlating successive frames of image data. The correlations compare the positions of unique structural or printed features in a sequence of image frames. Correlations are also made to previously stored position information specific to the structural or printed features.

In another application, the method is used in controlling a robotic device, such as a handling mechanism. In a third application, the method is used to determine rotation of a shaft or a gear. For example, a systematic pattern may be manifested by the top surfaces of teeth of the gear. Using gear teeth as the object surface requires that the field-of-view of a photosensor array be larger than the pitch of the teeth, so that there is always at least a portion of one tooth in view. Reliable navigation signals can be acquired, since gaps between the teeth create regions having no contrast and the teeth create regions with contrasting features.

DETAILED DESCRIPTION

Figure 1:
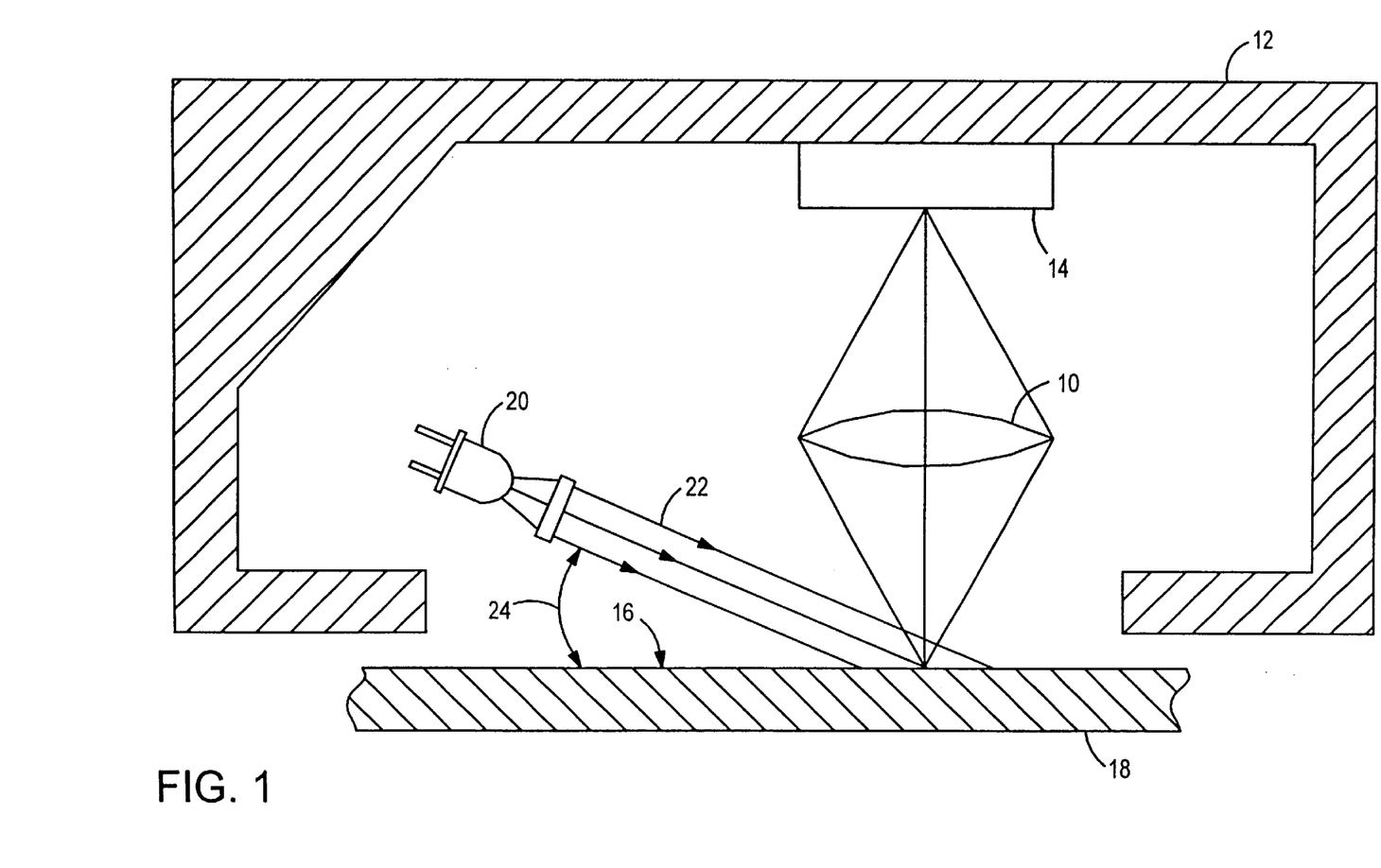
FIG. 1 is a side sectional view of an imaging device directed at a surface for acquiring information to be used in forming motion measurements in accordance with the invention.

With reference to FIG. 1, an exemplary device 12 for mounting a photosensor array 14 is shown as being directed at a surface 16 of an object 18. The device 12 may be a portion of a hand scanner or a robotic arm, as examples. Imaging optics 10 are attached such that one focal plane of the imaging optics is coincident with the surface 16 of the object 18, while the other focal plane is coincident with the sensor elements of the photosensor array 14.

An illumination source 20 is located to direct light 22 onto the surface 16 of the object 18 at a desired angle 24. The angle may be selected to provide grazing angle illumination of less than 160, but this is not critical to the invention. In some applications, right angle illumination may be beneficial. The illumination source 20 may be fixed in position or may be movable, allowing the angle of incidence to be adjusted as desired. In some instances, the angle 24 may be that of a center line of a converging or diverging beam.

The purpose of illuminating the surface 16 of the object 18 is to create light contrasts that are indicative of structural and/or printed features on the surface. The light contrasts can be imaged by the photosensor array 14 and used as landmarks within a time series of images, allowing motion measurements (i.e., velocity and/or navigation measurements) of relative movement between the device 12 and the object 18 during the time period of acquiring the time series.

The contrast patterns that are imaged by the photosensor array 14 depend upon the detectable features on the surface 16. In a robotic application, the features may be relatively large and may be easily detected without using an artificial illumination source 20. For example, in manipulating a payload of a spacecraft, there may be unique features on the outside of the payload. The structural features may be support frames or utility boxes. At a smaller level, the object 18 may be a posterboard made of wood or may be a document made of paper. Both wood and paper have fibers that create unique patterns when properly illuminated. Microscopic features of paper products can be used to create light contrasts that typically range from about 5 $\mu$m to 100 $\mu$m in size.

Typically, conventional illumination sources 20 provide acceptable contrast differentiations. For example, a linear array of high intensity light emitting diodes (LEDs) having an amber color may be used. The selection of the illumination source and its angle of incidence 24 on the surface 16 is dependent upon the features that are to be imaged by the photosensor array 14. The wavelength of light is selected to maximize the contrasts when the light is projected onto the surface. The illumination approach may include one or more LEDs with dome lenses or may include a light pipe consisting of a molded optical element designed to channel the illumination onto the surface with a minimal amount of light loss. Such a design may be made to provide relatively uniform illumination of a target area with a wide range of incident angles, while avoiding normally incident rays in order to avoid specular surface reflections. However, in some applications normally incident rays may be desired.

Coherent light from a laser may be used as an illumination source 20 if the surface of interest 16 is not translucent enough to result in multiple scattering. Multiple scattering from scattering centers lying at multiple depths in the object 18 can result in "boiling" of speckle patterns seen in the image of the object as the relative position of the object changes with time. However, even on a non-translucent surface, such as an aluminum surface, the deduction of object motion from pattern motion can be complicated by the specifics of the geometry of illumination, viewing, and relative motions involved. Therefore, incoherent illumination is the preferred illumination. For objects 18 that exhibit variations along a surface profile, collimated light is preferred. Collimated light is optical energy that travels in a single direction and therefore creates good surface profile shadows. For surfaces with printed markings but little surface profile, non-parallel light is preferred, since contrast is more a result of light scattering and absorption effects which do not depend upon divergence or convergence within the incident illumination. Collimation usually restricts available irradiance.

The imaging optics 10 may be used to collect and focus light energy from the surface 16 onto the photosensor array 14. An imaging lens or series of imaging lenses collects light that is reflected, scattered, transmitted or emitted from the surface and focuses it onto the elements of the array. The distances from the lens to the surface 16 and from the lens to the array 14 will depend on the selected lens for the particular applications and its desired magnification. For some applications, such as hand scanning, the distance from the lens to the object 18 may be in the millimeter range.

The photosensor array 14 is an array of discrete optically sensitive elements. The pitch of the elements, in conjunction with the magnification of the lens 10, affects the resolution of the image that the array can produce. The sensor array can be a charged coupled device (CCD), an amorphous silicon photosensor array, a CMOS photosensor array, or any type of active pixel sensor array.

Processing electronics and/or software is necessary to interpret and transfer relevant data. The electronics may include electronic or magnetic memory, microprocessors, ASICs, DSPs, etc. The software may include operating systems, applications, and database systems.

In accordance with the invention, knowledge of the positions of features along the surface 16 is acquired prior to the step of acquiring a time series of images by means of the photosensor array 14. The prior knowledge may be acquired by loading location information into memory for subsequent correlation with information acquired in real time. This approach is preferable when the predominant features of the surface 16 are systematically distributed and the object 18 is one that will be repeatedly involved in motion measurements. For example, the object 18 may be a gear having a systematic pattern of teeth, allowing measurements to be taken regarding the angular velocity of the gear. Using gear teeth and the spaces between gear teeth as the object surface requires that the field of view of the photosensor array 14 be larger than the pitch of the teeth, so that there is always at least a portion of one tooth in view. This ensures that there will be real surface contrast or image "texture" present with which to create a correlatable image. With gaps between the teeth creating regions returning little light to the sensor elements in the array 14 and teeth returning considerably more (gaps and teeth creating image contrast), reliable motion measurements can be obtained.

While a systematic pattern of features may be printed on the surface 16 of the object 18, random surface patterns are also preferred. A surface that provides an image with a random pattern of contrasts is preferred for use in tracking velocity over short displacements and/or navigation over short displacements based upon correlations of only slightly offset location images. A significant benefit of using random feature patterns in the "double correlation procedure" to be described below is that the resulting motion measurements are less susceptible to effects of slowly changing contamination or surface damage to the target pattern, since the affected target pattern will still be random and will be equally suitable for the correlation procedure.

Figure 2:
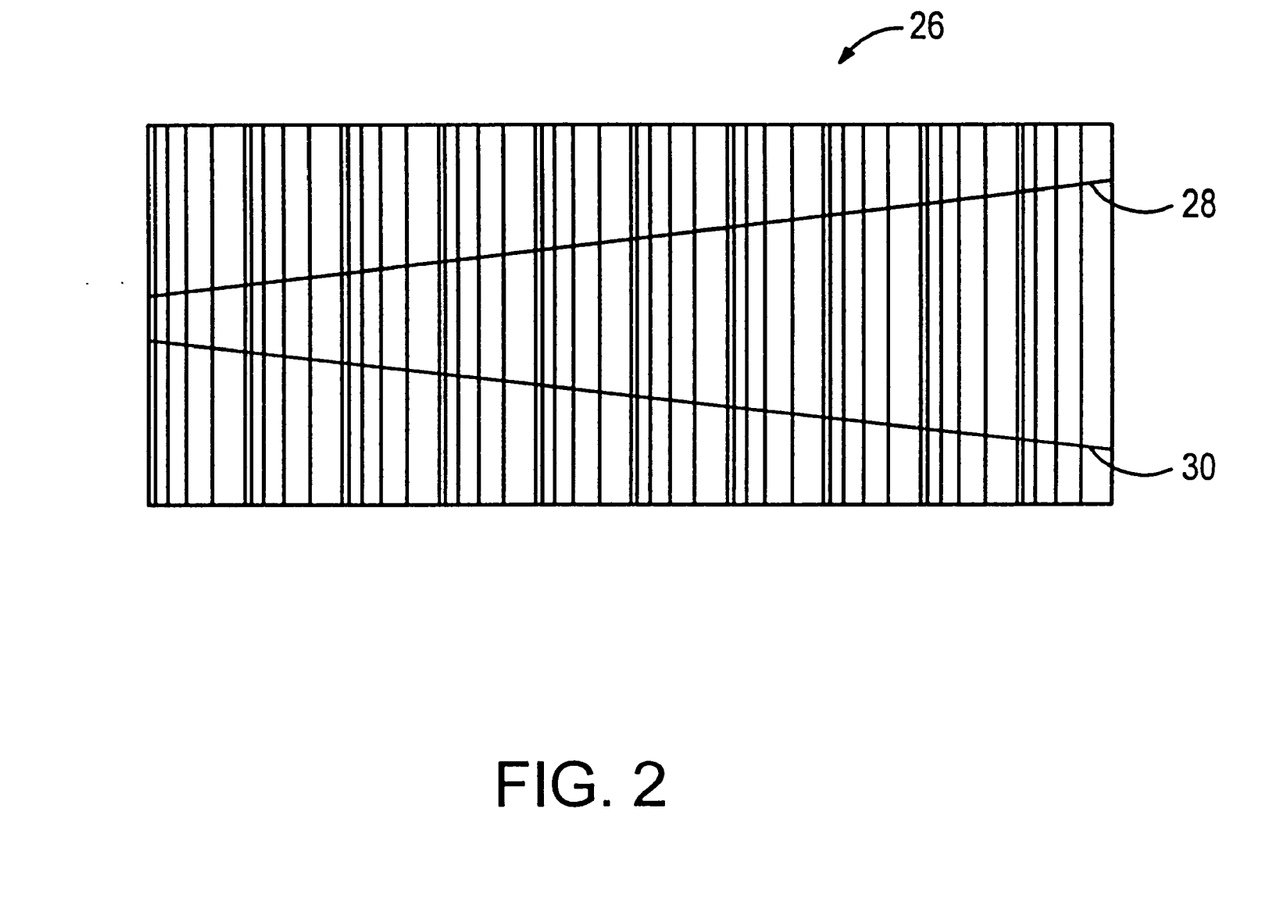
FIG. 2 is a top view of a pattern of features along a region of interest to allow each location within the region to be uniquely identified using a method in accordance with the invention.
Figure 3:
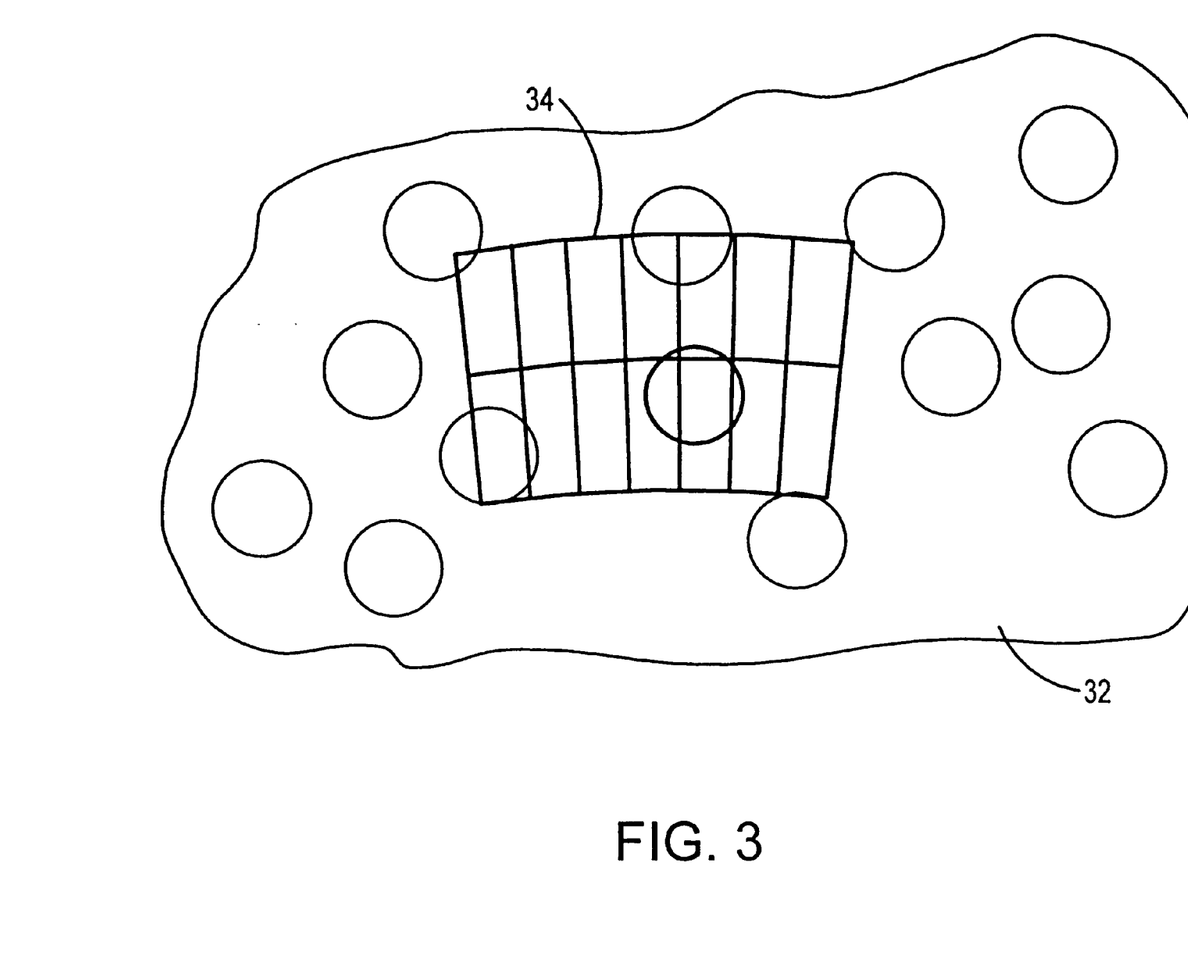
FIG. 3 is a top view of a second pattern of features for implementing the invention.
Figure 4:
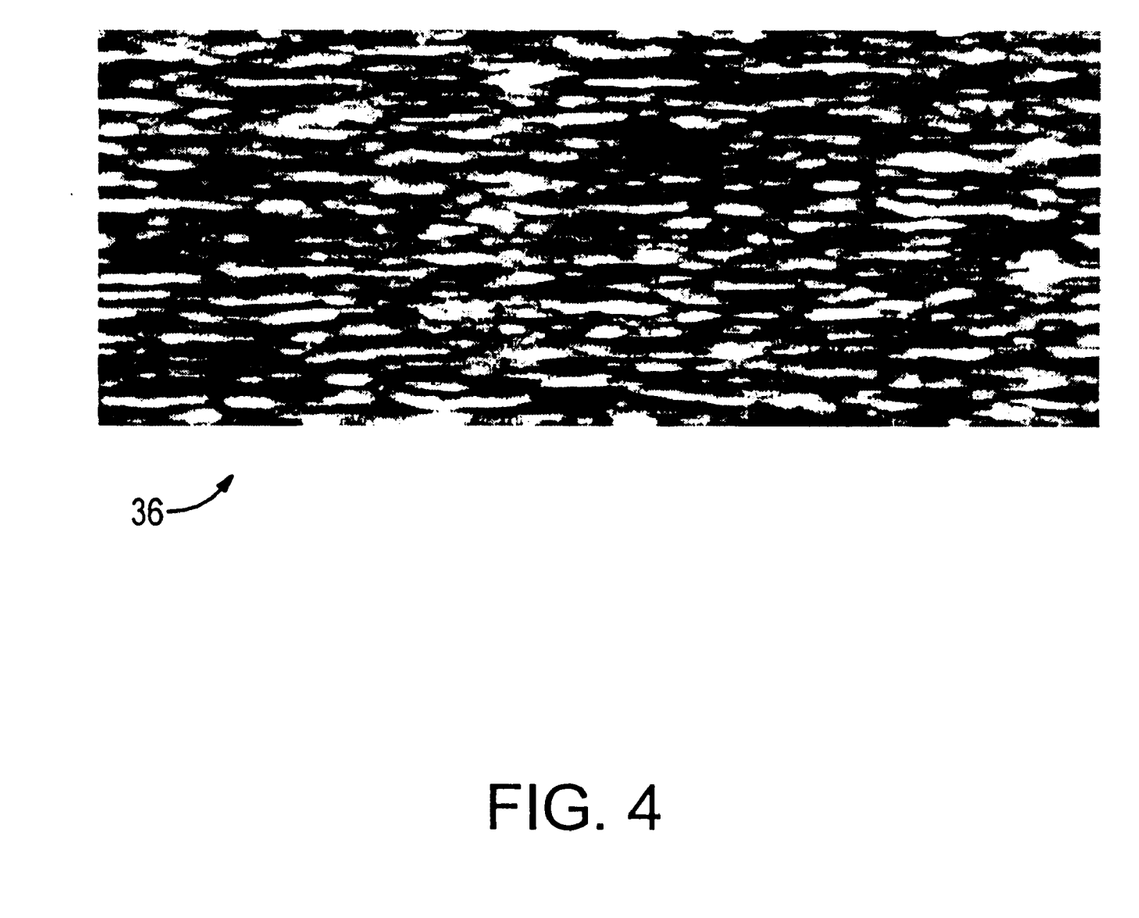
FIG. 4 is a top view of a third pattern of features for implementing the invention.

FIG. 2 is an example of a systematic pattern of features, while FIGS. 3 and 4 are illustrations of random patterns of features on a surface of interest. In FIG. 2, the object surface 26 is shown as having a series of parallel lines with varying line spacings. There are ten cycles of spacings, with each cycle being defined by five lines. In addition, there are two diverging lines 28 and 30 which may be used to differentiate the cycles when a field of view is less than the entirety of the object surface. This permits an accurate and absolute position determination along the length of the surface. Prior to forming a time series of images of the surface in order to enable correlations of successive image frames, data that identifies the line pattern of FIG. 2 is stored in memory. Thus, double correlation processing is possible in real time during the interval for acquiring the time series of images. As an alternative, the double correlation processing may occur subsequent to acquiring the time series.

Systematic patterns of features other than the one shown in FIG. 2 may be utilized, but preferably the pattern includes variations that allow unique identification of each location along the pattern. For example, a repeating pattern may have a scale that changes with position in a way known to detection and interpretation algorithms of the system. Another possible example is a pseudo-random surface pattern that is defined by the superposition of line segments that are formed as wavy stokes with a line width that varies randomly between an upper limit and a lower limit.

FIG. 3 is a random pattern of printed spots on a surface 32. As an alternative to randomly positioned spots, the spots may be random in size, shape, orientation, density or color. Also shown in FIG. 3 is a non-rectilinear photosensor array 34. Such an array is particularly useful in applications such as determining the velocity of rotation of a shaft. The array may be shaped to a cylindrical coordinate system with the center of symmetry being at or near the axis of rotation of the shaft, with the random spot pattern being formed on a gear that is coaxial with the shaft. The use of a random pattern of spots allows the center of symmetry of the array 34 to be non-coaxial with the shaft or any possible symmetry of the random pattern.

Referring now to FIG. 4, the random pattern 36 may be "inherent structural features" of the surface of interest. For example, paper fibers, scratches and pits often render patterns of sufficient contrast to enable the double correlation processing, if properly illuminated. As previously noted, grazing angle illumination (i.e., an incidence angle of less than 16°) can reveal high contrasts. Grazing angle illumination is described in U.S. Pat. No. 5,686,720 to Tullis, which is assigned to the assignee of the present invention. On the other hand, smoother surfaces may exhibit little contrast when illuminated at an incident angle of less than 45°, but may provide sufficient contrasts when exposed to normally incident illumination.

The surface pattern 36 of FIG. 4 may be used to provide accurate measurements of relatively small displacements in two dimensions. A similar pattern with contrasts in only one direction would be suitable for measuring velocity or navigation in one direction. Contrast patterns may be due to high contrast printing or color variations. Still other surface patterns may be designed and manufactured using known technology in diffractive optics to create etched, molded or embossed reliefs in surfaces having pseudo-random patterns. An intentionally formed pattern may be a random distribution of pixel-like squares equivalent in size to a subarray of two-by-two pixels of the photosensor array or greater.

Figure 5:
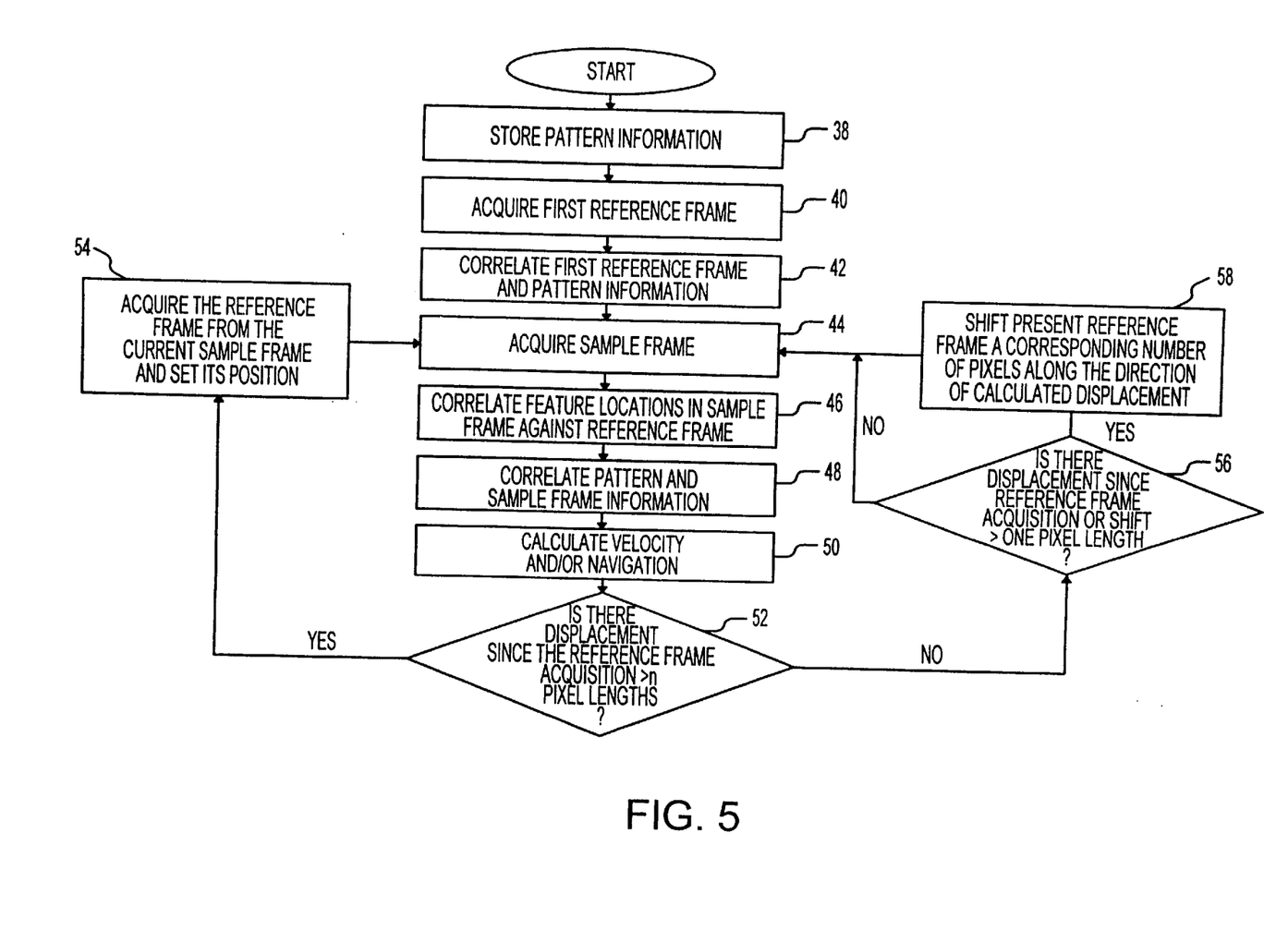
FIG. 5 is a process flow of steps for implementing double correlation processing in accordance with the invention.

FIG. 5 is a process flow of steps for calculating velocity and/or navigation. The process may be used in hand scanning an original or in other applications. In step 38, pattern information is stored in memory. For example, a document can be scanned in order to form a map of features on an original, so that the map can be used for correlation purposes during real time acquisition of the time series of images. Alternatively, the pattern information may be acquired by means independent of the scanning process. In some cases, the scanned pattern might be that of printed data comprising a template or definition of a printed form.

In step 40, the first frame of image information is acquired using an imaging device, such as a photosensor array. Initially, the first frame is the reference frame that is used in the correlation processing.

While not critical, there is a preferred step 42 of correlating the first frame of image information with the stored pattern information. Since the pattern information may be used to uniquely identify any location within the region of interest (e.g., a scanned document), the correlation step 42 allows the process to establish a starting position within the region of interest. The accuracy of the correlation step 42 depends upon the capability of the imaging device to acquire sufficient image information to enable a comparison. The larger the field of view of the imaging device, the more reliable will be the correlation step 42. Similarly, the greater the differentiation within the pattern of features within the region of interest, the greater the reliability. If the correlation step 42 is not utilized, the starting position may be initialized by setting x=y=0. That is, the reference frame acquired at step 40 may be considered to have x and y coordinates set at 0.

In step 44, after a sampling interval, a new sample frame is acquired. The sampling interval between frames should be sufficiently short to allow imaged features to move no more than one pixel length during the sampling interval, in order to restrict the correlation search in step 46 to plus or minus one pixel in each direction. Embodiments are feasible in which sampling intervals are greater and the image motion between samples can be greater than one pixel, but this can require greater coherence length for the surface features, and may require more complex searching algorithms for correlation extrema. In step 46, correlation takes place between the sample frame stored at step 44 and the reference frame that was acquired in step 40 for the first time and step 54 thereafter. In step 48, correlation takes place between the pattern information stored in step 38 and the most recent sample frame acquired in step 44. The order of the correlation steps 46 and 48 is interchangeable. Correlations compare the positions of contrast pattern features that are stored or imaged. A nearest-neighbor correlation will be described more fully below with reference to FIG. 6. Comparing the reference frame to the sample frame is accomplished by first utilizing the reference frame to establish an array of templates that indicates nine possible directions of movement for the reference frame, including no movement at all. The count of nine positions is a result of using a rectangular array geometry, such that an image feature in one frame could feasibly move toward any of the nearest-neighbor positions, or not move at all. Correlation values are calculated. The calculation process applies equally with respect to correlating the stored pattern information from step 38 with one or more of the sample frames. For example, the stored pattern information may be used to generate numerous templates that are compared with the frames to establish correlation values. The correlation values of steps 46 and 48 represent the degree of similarity between each template and a sample frame.

In step 50, velocity or navigation information is calculated from the results of steps 46 and 48. Preferably, velocity is calculated only after the time series of sample frames has been acquired, rather than after each sample frame, unless the application demands otherwise. The accuracy and precision of the information acquired at step 50 is significantly enhanced by the double correlation processing of steps 46 and 48. By using prior stored pattern information in addition to providing comparisons between successive frames in a time series, motion tracking is both accurately and precisely identified.

The correlation values of steps 46 are used to find the locations of identical features in successive frames in order to determine the displacements (dx, dy) of the features from frame-to-frame. Summing or integrating these displacements and correcting for scale factors introduced through the design of the relevant optics determine the displacement of the imaging device as relative movement between the imaging device and the region of interest progresses. The process provides a high degree of correlation match and thereby a high degree of precision. Any errors that do occur will accumulate if calculating the correlation values is automatically and continuously followed by a step of shifting the present sample frame to the reference frame designation. In order to place a restriction on the growth rate of "random walk" error, the shifting of a sample frame to be a new reference frame for a subsequent series of correlation calculations can be performed less often. The object displacement between the locations of the less frequently shifted new reference frame is referred to as a "macrostep."

At step 52, the determination is made as to whether the sample frame acquired at step 44 should replace the reference frame acquired at step 40 for the subsequent series of correlation computations. If the accumulated displacement since acquisition of the reference frame at step 40 (or acquired at 44 and subsequently made a reference frame earlier at step 54) exceeds a predetermined number (n) of pixel lengths, the sample frame is substituted as the new reference frame at step 54. The new reference frame and the next sample frame acquired at step 44 are then used in implementing steps 46, 48 and 50. On the other hand, if the displacement is determined to be less than n pixel lengths at step 52, a second pixel length comparison occurs at step 56. A displacement of less than one pixel length since the last reference frame acquisition (acquired at step 40 or 44) or shift (at step 58) of a reference frame allows the process to return without effect on the reference frame to the step 44 of acquiring the next sample frame. However, if the displacement is greater than one pixel (but less than 2 pixels), the present reference frame is shifted at step 58 in the direction of the calculated displacement. For example, if the calculated displacement in steps 46–48 is one pixel length upward and one to the right, the present reference pixel is shifted in step 58 upwardly one pixel and to the right one pixel.

As an example of the implementation of steps 52, 54, 56 and 58, it will be assumed that the predetermined limit on the displacements that can occur before a new reference frame is established at step 44 is four pixel lengths. That is, n=4 in step 52. After each calculation of a displacement in steps 46–50, it is determined whether the accumulated displacement increments exceed four pixel lengths. If the accumulated displacement is less than four pixel lengths, step 56 determines whether the displacement is greater than one pixel length since the last shift of the present reference frame at step 58 or the last acquisition of a reference frame at step 40 (or acquired at 44 and subsequently made a reference frame earlier in step 54). A "no" determination at step 56 returns the process to step 44 without effect on the reference frame. A "yes" determination will result in a shift of the reference frame in step 58 in the direction of the calculated displacement. Following the shift, the next reference frame is acquired at step 44 and the shifted reference frame and the newly acquired sample frame are used in the correlation processing of steps 46 and 48. After a number of shifts of the present reference frame, the determination at step 52 will lead to a "yes" determination. As a result, the current sample frame becomes the new reference frame at step 54, and the process continues.

Figure 6:
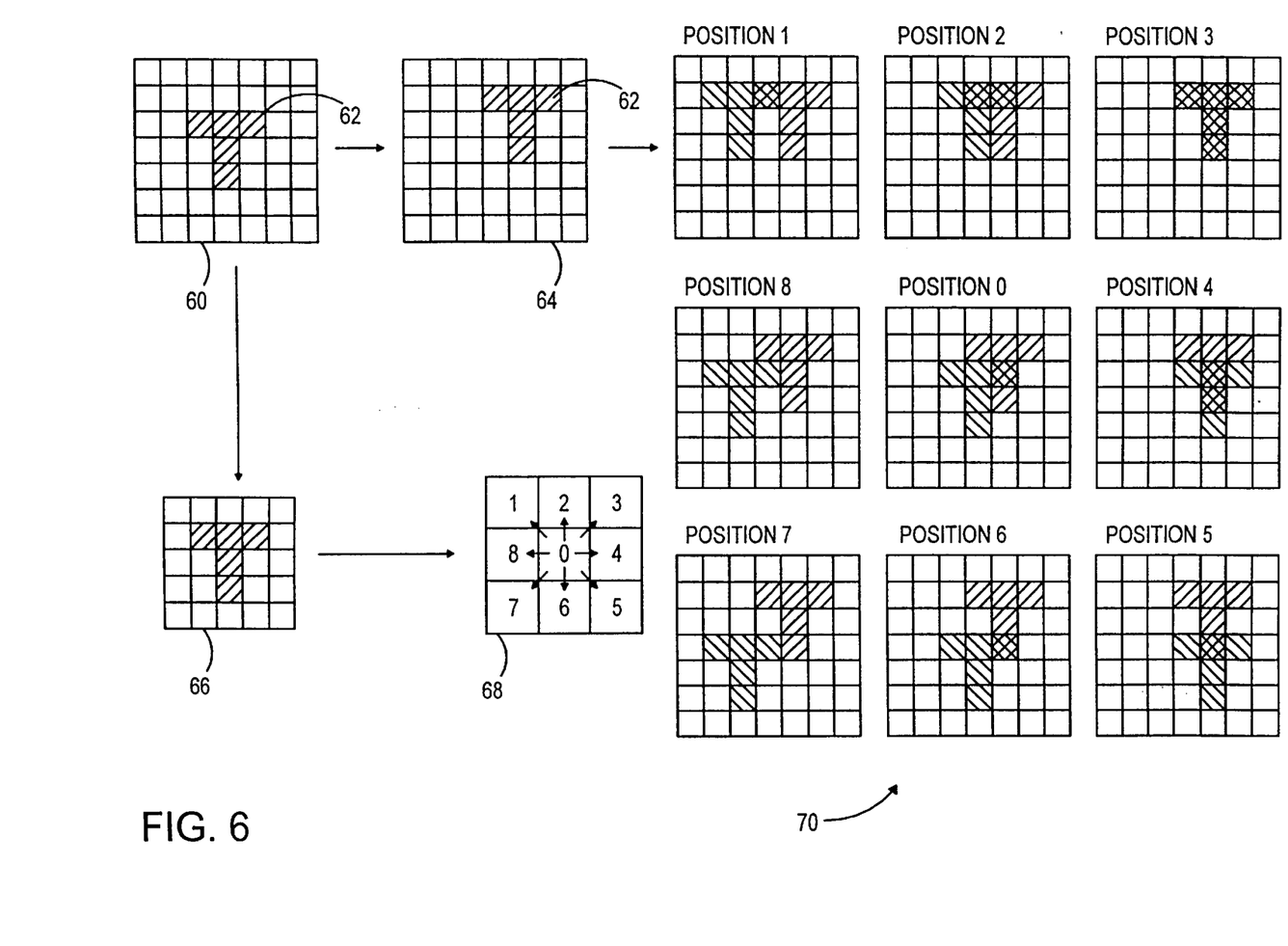
FIG. 6 is a schematic view of intra-series correlation.

One embodiment of calculating correlation values will be described with reference to FIG. 6. A reference frame 60 is shown as having an image of a T-shaped structural feature 62. The size of the reference frame depends upon factors such as the maximum relative movement between the imaging device and the region of interest, the spatial frequencies in the imaging of the structural or printed features of the region of interest, and the image resolution of the photosensor array. A practical size of the reference frame 60 for a moving photosensor array that is thirty-two pixels (n) by sixty-four pixels (m) is 24×56 pixels.

At a subsequent time (dt), the photosensor array acquires a sample frame 64 which is displaced with respect to the reference frame 60, but which includes the same structural feature 62. The duration dt is preferably set such that relative displacement of the T-shaped feature 62 is equal to or less than one pixel of the photosensor array at the velocity of relative movement. An acceptable time period is 50 microseconds for velocities of as high as 0.45 meters/seconds at resolutions of twelve line-pairs per millimeter.

If the photosensor array has moved during the time period dt between acquiring the reference frame 60 and the sample frame 64, the first and second images of the T-shaped feature 62 will be ones in which the feature has shifted. While the preferred embodiment has a sample time that allows equal to or less than a full-pixel movement, the schematic representation of FIG. 6 shows the feature 62 as being shifted upwardly and to the right by one pixel. The full-pixel shift is assumed only to simplify the representation.

Element 68 represents a sequential shifting of the pixel values of a subframe 66 of the reference frame 60. The sequential shifting represented by element 68 provides an array 70 of templates in which the pixel values of subframe 66 are shown in eight different nearest-neighbor pixel positions. A ninth position is represented by no shift. That is, step "0" does not include a shift, step "1" is a diagonal shift upward and to the left, step "2" is an upward shift, etc. In this manner, the nine pixel-shifted templates can be combined with the sample frame 64 to produce the array 70 of template-to-sample comparisons. The position frame designated as "Position 0" does not include a shift, so that the result is merely a combination of frames 64 and 66. "Position 3" has the minimum number of shaded pixels, and therefore is the frame with the highest correlation. Stated differently, "Position 3" is the template-to-sample comparison with the greatest overlap of the two representations of the T-shaped feature 62 within the frames 60 and 64. Based upon the correlation results, the position of the T-shaped feature in the sample frame 64 is determined to be a diagonal rightward and upward shift relative to the position of the same feature in the earlier-acquired reference frame 60. In a scanning application using an inverting single lens, this implies that the scanning device has moved rightwardly and upwardly during the time dt.

Different correlation approaches may be implemented. One acceptable approach is a "sum of the squared differences correlation." For the embodiment of FIG. 6, there are nine correlation coefficients (Ck=C0, C1 . . . C8) formed from the nine offsets at element 68, with the correlation coefficients being determined by equation:

$$C_k = \sum_i \sum_j (S_{ij} - R_{(ij)+k})^2$$

where $S_{ij}$ denotes the sensor-measured value at the position ij of the sample frame 64 and $R_{ij}$ denotes the sensor-measured value at the subframe 66 as shifted at the element 68 in the k direction, with k being the identifier of the shift at element 68. In FIG. 6, k=3 provides the correlation coefficient with the lowest value.

In the more general case, the displacement of two successive frames will be a fraction of a whole pixel dimension in each direction such that it does not create the lowest possible minimum correlation coefficient at one of the eight outer template positions. In this case, it may be necessary to interpolate a subpixel displacement value. This can be done by calculating a "quadratic plus cross-terms" fit to the nine sums of square differences calculated above. The nine correlation values represent possible displacements in the eight compass directions and a null displacement. The true displacement is determined by calculating the position of the minimum value of the smooth regressively fit mathematical surface.

A similar approach may be taken in the correlation of the frames 60 and 66 of image information with the previously stored pattern information of the region of interest. That is, in FIG. 5, the correlation step 48 may be executed using techniques similar to the correlation step 46, but sometimes requiring correlation searches over many more than the above 9 nearest neighbors.

One application of the invention will be described with reference to FIGS. 7–9. A portable, hand-held scanning device 72 is shown as having followed a meandering path 74 along an original 76. The original may be a piece of paper, overhead transparency film, or any other image-bearing surface upon which contrast variations provide position information during navigation along the meandering path. Typically, the low intensity and high intensity features of the resulting contrast pattern are tracked and the navigation information is used to rectify image data. The scanning device is preferably self-contained and battery operated, but may include a connection to an external source of power or to data ports of computers or networks. These connections may be wireless, i.e., via infrared or radio links. The scanning device is shown as including a display 78 (which may be a video display), but this is not critical.

The scanning device 72 allows three degrees of freedom, with two being in translation and one in rotation. The forward face 80 of the device may include a pivoting member 82 that aids in maintaining proper contact between the original 76 and an imaging sensor 84. Navigation sensors 86 and 88 are located at the opposite ends of the imaging sensor. Because the navigation sensors are mounted on the pivoting member, the navigation sensors are in a fixed location relative to the imaging sensor.

The imaging sensor 84 is shown as a linear array of discrete optically sensitive elements. The spacing of the elements is one factor in determining the spatial resolution of the scanner 72. For example, a linear array having a length of 101.6 mm requires 1200 sensor elements to achieve a resolution of 300 dpi. The sensor may be a charged coupled device (CCD), an amorphous silicon photodiode array a CMOS array, an active photosensor array, or any other type of linear array sensor known in the art.

A key consideration in the design of the imaging sensor unit is speed. The imaging sensor 84 preferably is able to image each pixel at approximately 10K samples per second. If the scanning device is moved too quickly, the imaging operation will be adversely affected. An advantage of the velocity measurements that are obtainable using the process described with reference to FIG. 5 is that an indicator (not shown) may be added to the scanning device 72 in order to provide a warning that a recommended maximum speed has been exceeded. For example, information acquired using the navigation sensors 86 and 88 may be used in combination with previously stored pattern information to provide an accurate measure of velocity and to use the measure to trigger illumination of an LED to off when a velocity threshold has been exceeded.

Figure 7:
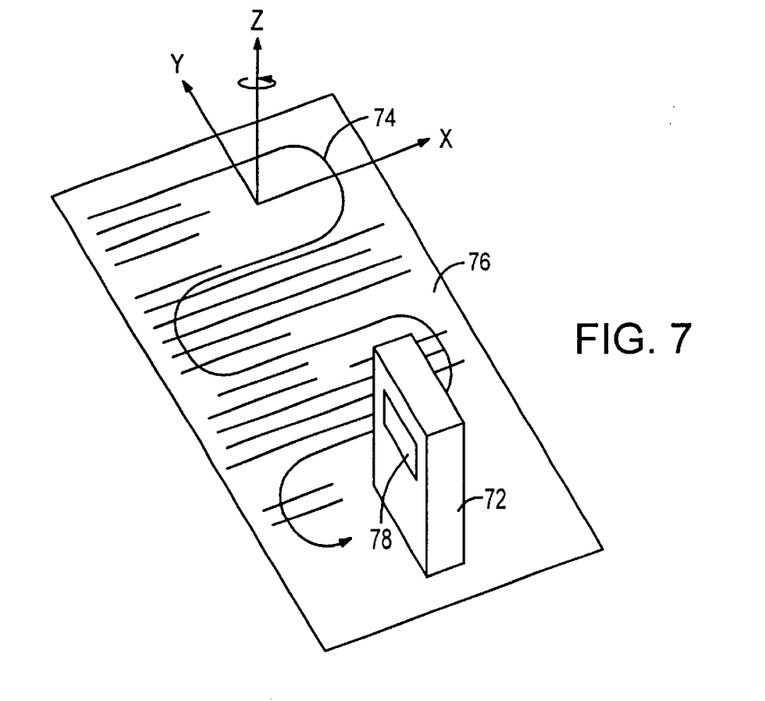
FIGS. 7–9 are views of a hand-held scanning device as one application of the invention.
Figure 8:
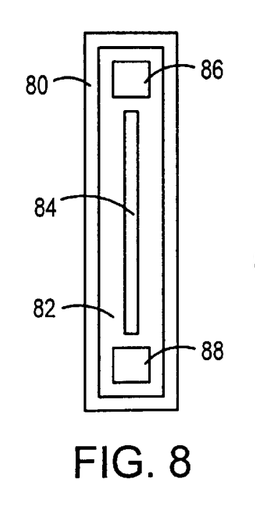
Figure 9:
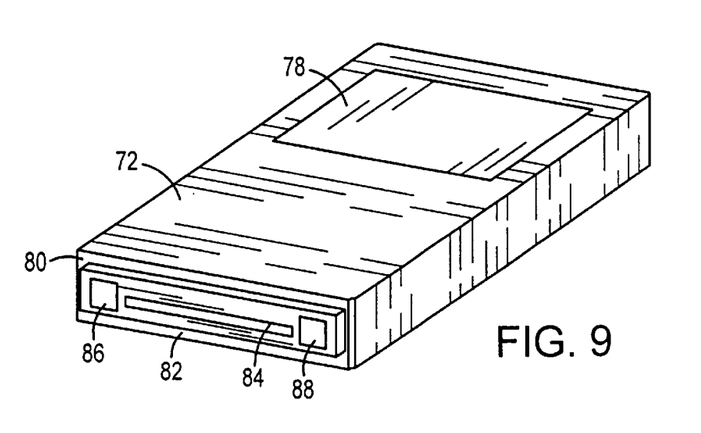

The results of the sample correlation processing of FIG. 5 may also be used in the operation of the scanning device 72 to "stitch" the image information acquired using the imaging sensor 84 of FIGS. 7–9. The meandering path 74 is shown as having four and a fraction swathes, i.e., side-to-side passes across the original 76. The swathes should include regions of overlap, so that a stitching process can be used to produce a faithful reproduction of the original image. The reproduction is described in detail in the U.S. Pat. No. 5,578,813 to Allen, Tullis et al., which is assigned to the assignee of the present invention.

When applying the correlation processing of surface tracking using a time series of images of the region of interest having randomly distributed features, DC filtering and/or bandpass filtering may be used to increase the signal-to-noise-ratio of the correlation values. Any influences of pixel values that do not change significantly when the relative movement between the imaging device and the region of interest occurs can be filtered prior to the correlation process. Similarly, pixel values that change by an order of magnitude less than the majority of the other pixels are likely to be noise and can be filtered to provide improved correlation performance. In instances in which very little noise is present, it is useful to apply non-linear transformations (such as logs) to non-linearly compress the range of raw pixel value data, and to take powers of spatial gradients to expand the contrast values when a majority of the spatial gradients are small.

What is claimed is:

1. A method of identifying motion comprising steps of:
   storing position information that is relevant to distinguishing locations within a region of interest;
   providing relative movement between an imaging means and said region of interest;
   acquiring a sequence of images using said imaging means during said relative movement; and
   determining at least one of velocity and navigation specific to said relative movement based on identifying image correlations within said images and further based on correlating said images with said position information that is relevant to distinguishing said locations within said region of interest.

2. The method of claim 1 wherein said step of storing position information includes storing parameter data relating to imageable features within said region of interest, said step of determining at least one of velocity and navigation including correlating said parameter data with that of images of said imageable features acquired within said sequence.

3. The method of claim 2 wherein said step of determining said at least one of velocity and navigation includes tracking positions of said imageable features within said sequence and includes correlating data at said positions with said parameter data.

4. The method of claim 2 wherein said step of storing position information includes imaging surface features of said region of interest and using relative positions of said surface features to distinguish locations within said region of interest.

5. The method of claim 4 further comprising a step of filtering said signals representative of said images of said sequence, said signals being generated by an array of sensor elements, said filtering including adjusting values from sensor elements when said values are outside of a preselected range of anticipated values.

6. The method of claim 5 wherein said step of storing position information includes providing memory of said surface features prior to said step of acquiring said sequence of images.

7. The method of claim 1 wherein said region of interest is a surface of a document, said step of acquiring said sequence includes utilizing a two-dimensional array of sensor elements to capture a sequence of frames of image data as said array is moved relative to said surface, said step of determining at least one of velocity and navigation including tracking positions of surface features on said surface with movement of said array.

8. The method of claim 1 further comprising steps of:
   capturing image signals separately from said step of acquiring said sequence of images; and
   utilizing determinations of said at least one of velocity and navigation to produce an image of said region of interest by manipulating said image signals based on said determinations.

9. The method of claim 1 wherein said step of storing said position information includes providing memory of a known pattern having systematic variations of surface features.

10. The method of claim 9 wherein said known pattern is printed matter on a template or form document.

11. The method of claim 1 wherein said step of storing said position information includes providing memory of a non-repeating pattern of surface features.

12. A method of measuring motion comprising steps of:
storing data specific to an arrangement of detectable features on a surface of interest;
forming a time series of images of said surface of interest by utilizing an imaging device;
tracking positions of said detectable features within said images of said time series such that variations in the relative positions of said imaging device and said surface of interest during formation of said time series is detected;
correlating said positions of said detectable features within said images with said data specific to said arrangement of said detectable features on said surface of interest; and
determining navigation of said imaging device relative to said surface of interest during said formation of said time series, including basing said determination of navigation upon said step of tracking and said step of correlating said positions of said detectable features within said images with said data specific to said arrangement of said detectable features on said surface of interest.

13. The method of claim 12 further comprising a step of utilizing said determination of navigation as a basis for controlling a computer software operation.

14. The method of claim 13 wherein said computer software operation includes manipulating a robotic device.

15. The method of claim 13 wherein said computer software operation includes manipulating image signals that are acquired independently but concurrently with said time series, said manipulating thereby providing an output image that is responsive to said determination of navigation.

16. The method of claim 15 further comprising a step of acquiring said image signals using a sensor means that is coupled to a hand-held scanner to image said surface of interest.

17. The method of claim 12 wherein said step of storing data includes identifying locations of inherent features of a paper document.

18. A method of identifying motion comprising steps of:
storing position information relevant to distinguishing locations within a region of interest by providing memory of a random pattern of surface features within said region of interest;
providing relative movement between an imaging means and said region of interest;
acquiring a sequence of images using said imaging means during said relative movement; and
determining at least one of velocity and navigation specific to said relative movement based on identifying image correlations within said images and further based on correlating said images with said position information.

19. A method of measuring motion comprising steps of:
forming detectable features on a surface of interest in an arrangement such that locations on said surface of interest are uniquely identifiable based on said arrangement;
storing data specific to said arrangement of said detectable features on said surface of interest;
forming a times series of images of said surface of interest by utilizing an imaging device;
tracking positions of said detectable features within said images of said time series such that variations in the relative positions of said imaging device and said surface of interest during formation of said time series is detected;
correlating said positions of said detectable features within said images with said data specific to said arrangement of said detectable features on said surface of interest; and
determining navigation of said imaging device relative to said surface of interest during said formation of said times series, including basing said determination of navigation upon said step of tracking and said step of correlating said positions of said detectable features within said images with said data specific to said arrangement of said detectable features on said surface of interest.

20. The method of claim 19 wherein said step of forming said detectable features includes providing a systematic pattern of said detectable features.

21. The method of claim 20 wherein said systematic pattern is a pattern of printed matter on a template or form document.

22. The method of claim 19 wherein said step of forming said detectable features includes providing a non-repeating pattern of said detectable features.

* * * * *